United States Patent [19]

Avery

[11] 4,074,615
[45] Feb. 21, 1978

[54] ORBITING MOTOR GEAR DRIVE

[75] Inventor: Bennett W. Avery, Peoria, Ill.

[73] Assignee: Caterpillar Tractor Co., Peoria, Ill.

[21] Appl. No.: 730,554

[22] Filed: Oct. 7, 1976

[51] Int. Cl.² .......................................... F01B 13/06
[52] U.S. Cl. ...................................... 91/490; 91/492
[58] Field of Search ............... 91/490, 488, 491–495; 417/273

[56] References Cited

U.S. PATENT DOCUMENTS

| 3,036,557 | 5/1962 | Kimsey | 91/494 |
| 3,320,902 | 5/1967 | Paschk | 417/273 |
| 3,762,488 | 10/1973 | Dammon | 91/492 |
| 3,899,957 | 8/1975 | Carlson | 91/490 |
| 3,943,826 | 3/1976 | Kita | 91/488 |
| 3,978,771 | 9/1976 | Burnight et al. | 91/491 |
| 3,998,133 | 12/1976 | Kuroki | 91/488 |

FOREIGN PATENT DOCUMENTS 1,322,891  7/1970  United Kingdom ............ 91/492

Primary Examiner—William L. Freeh
Attorney, Agent, or Firm—Phillips, Moore, Weissenberger, Lempio & Majestic

[57] ABSTRACT

A drive apparatus for a rotary output member of a vehicle or the like includes a pair of orbiting members having outwardly-projecting teeth which engage with inwardly-projecting teeth of an output member. Hydraulically-actuated piston and cylinder means provide orbiting of the orbiting members to in turn rotate the rotary output member.

14 Claims, 11 Drawing Figures

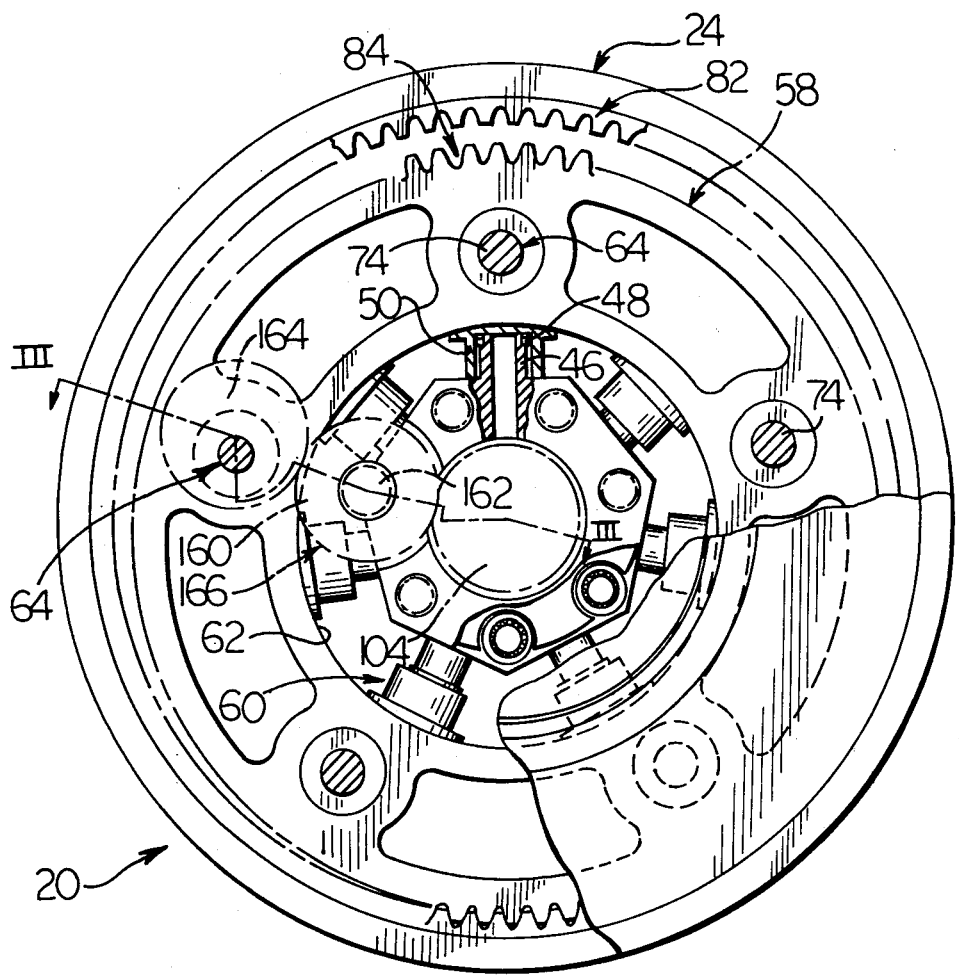
FIG_2_
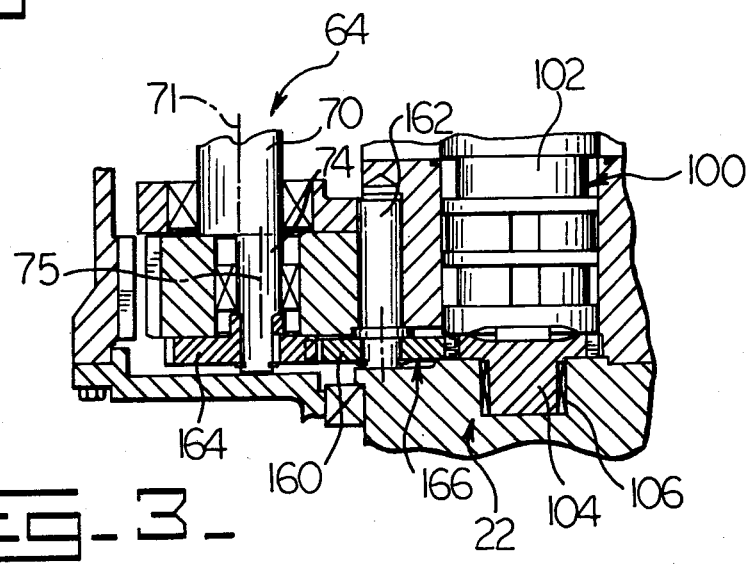
FIG_3_

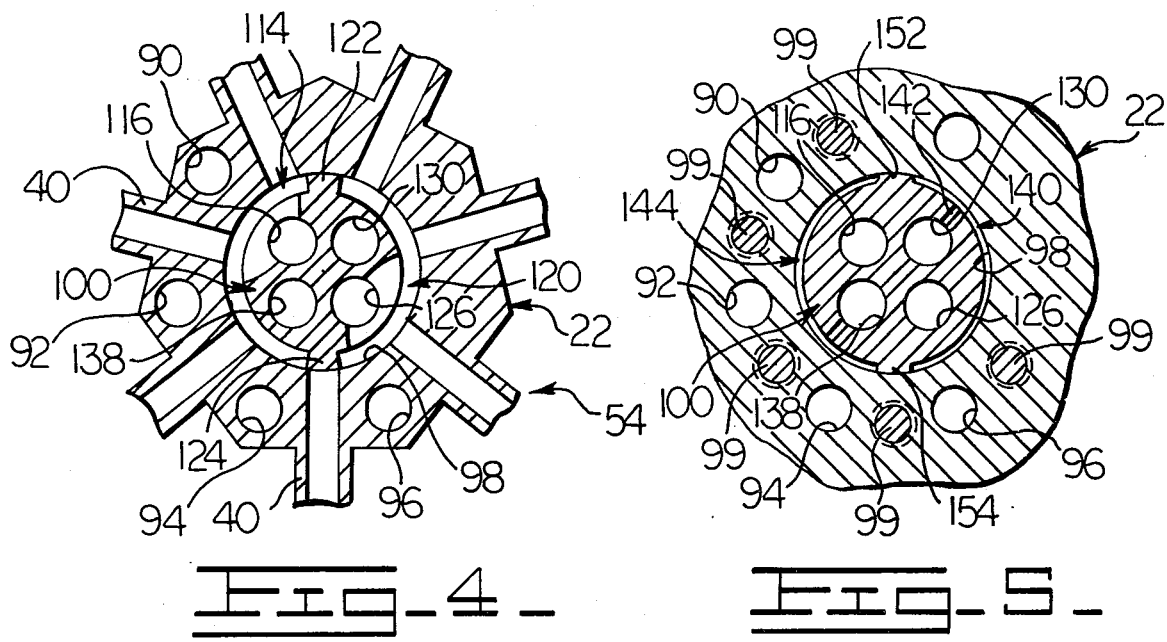
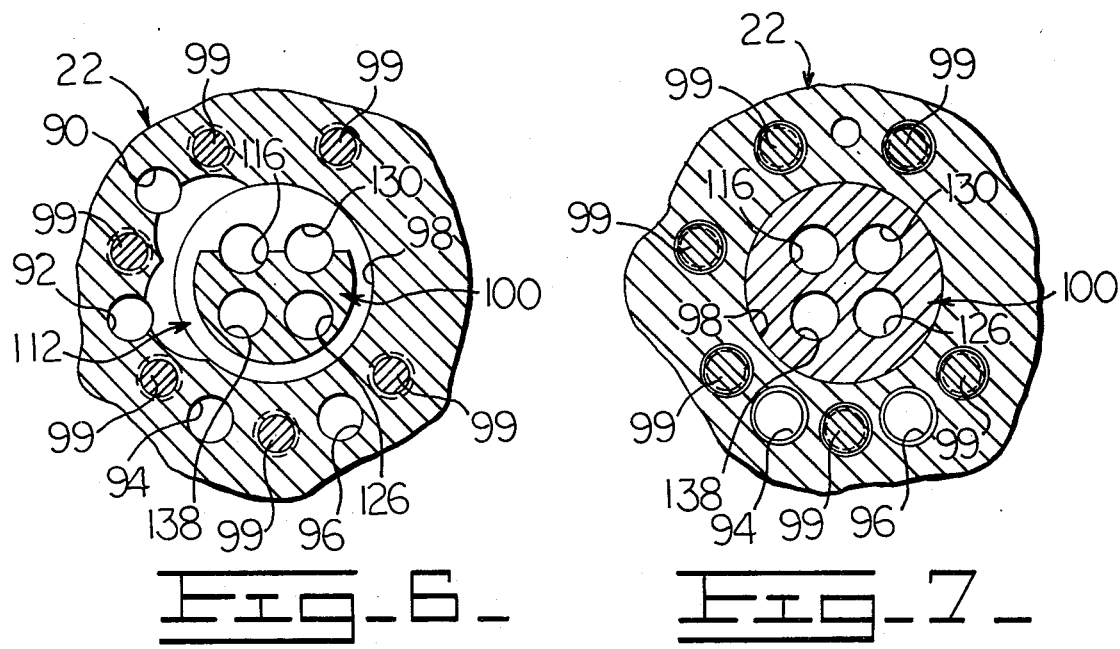

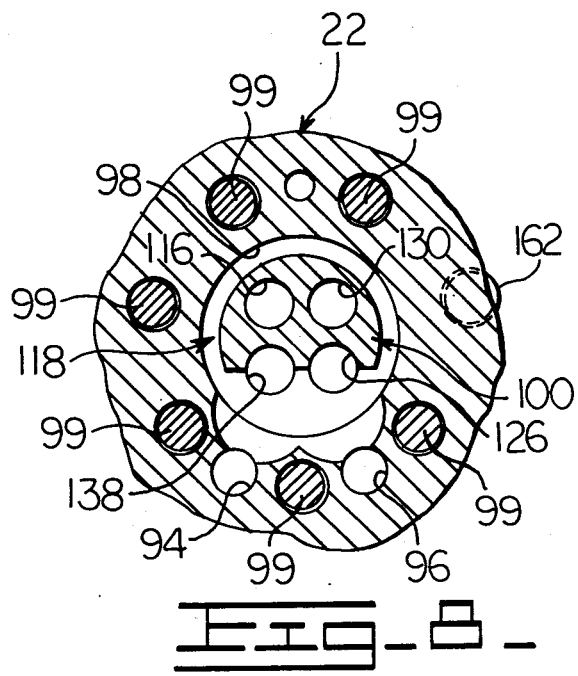
Fig-8-
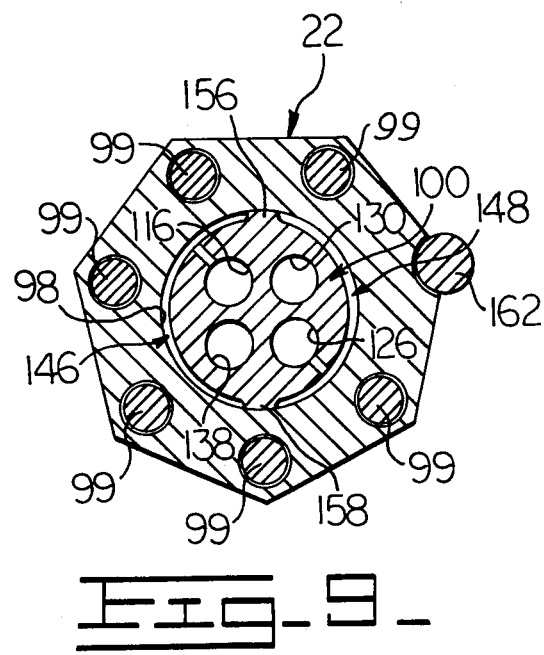
Fig-9-
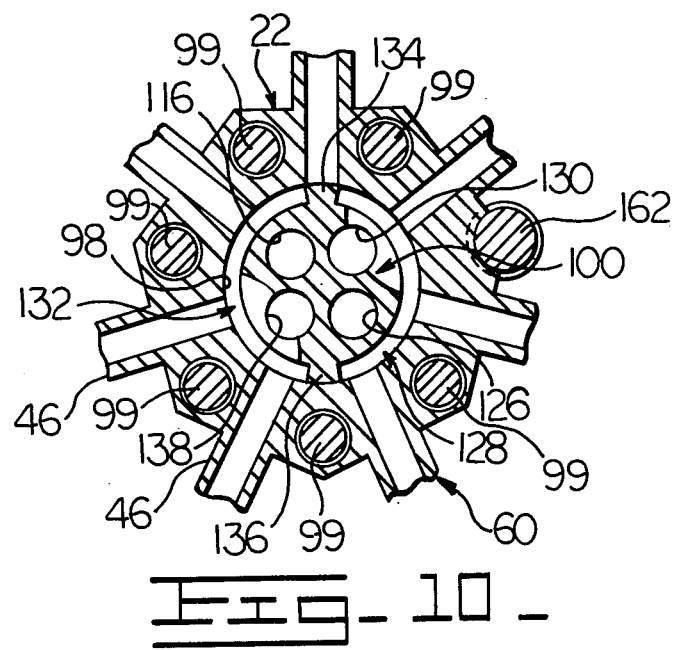
Fig-10-

ORBITING MOTOR GEAR DRIVE

BACKGROUND OF THE INVENTION

This invention relates to energy translation devices, and more particularly to such devices employed for translating energy, in the form of fluid pressure, into energy, in the form of mechanical rotation, or vice versa.

More specifically, the invention is concerned with improvements in such devices having an orbital member or members in driving or driven association with a rotatable member.

Devices of the general class to which the invention pertains and which employ a rotatable element in combination with an orbital member are disclosed in, for example, U.S. Pat. Nos. 3,339,460; 3,613,510; and 3,796,525. The present invention improves on the devices disclosed in such patents by providing piston and cylinder means operatively coupled with orbiting members, which in turn are mechanically engaged with an outer rotary member. The present device is extremely compact in overall structure, and highly simple and effective in design.

Of more general interest in this area is U.S. Pat. No. 3,796,052.

SUMMARY OF THE INVENTION

It is accordingly an object of this invention to provide an improved device of the class mentioned, wherein the orbital members are operatively coupled with hydraulic piston and cylinder means.

It is a further object of this invention to provide a device which, while fulfilling the object, is extremely compact in overall configuration, and lends itself particularly to use as a drive unit for driving a rotary output member of, for example, a vehicle.

Broadly stated, the invention comprises a fluid pressure apparatus comprising fixed body means, and an orbiting member disposed about said fixed body means defining a plurality of outwardly-projecting teeth. Means are included for movably mounting the orbiting member relative to the fixed body means for determining orbiting movement of the orbiting member relative to the fixed body means. A plurality of piston and cylinder means operatively interconnect the fixed body means and orbiting member. Means are included for conveying fluid to and from the piston and cylinder means. Rotary body means are included defining a plurality of inwardly-projecting teeth of a number greater than the number of teeth defined by the orbiting member, the teeth of the orbiting member being adaptable for engagement with the teeth of the rotary body means.

BRIEF DESCRIPTION OF THE DRAWINGS

These and other objects of the invention will become apparent from a study of the following specification and drawings, in which:

FIG. 2 is a front view, partially in section and partially broken away, of the apparatus of FIG. 1;

FIG. 3 is a sectional view taken along the line III—III of FIG. 2;

FIG. 4 is a sectional view taken along the line IV—IV of FIG. 1;

FIG. 5 is a sectional view taken along the line V—V of FIG. 1;

FIG. 6 is a sectional view taken along the line VI—VI of FIG. 1;

FIG. 7 is a sectional view taken along the line VII—VII of FIG. 1;

FIG. 8 is a sectional view taken along the line VIII—VIII of FIG. 1;

FIG. 9 is a sectional view taken along the line IX—IX of FIG. 1;

FIG. 10 is a sectional view taken along the line X—X of FIG. 1; and

DESCRIPTION OF THE PREFERRED EMBODIMENTS

Figure 1:
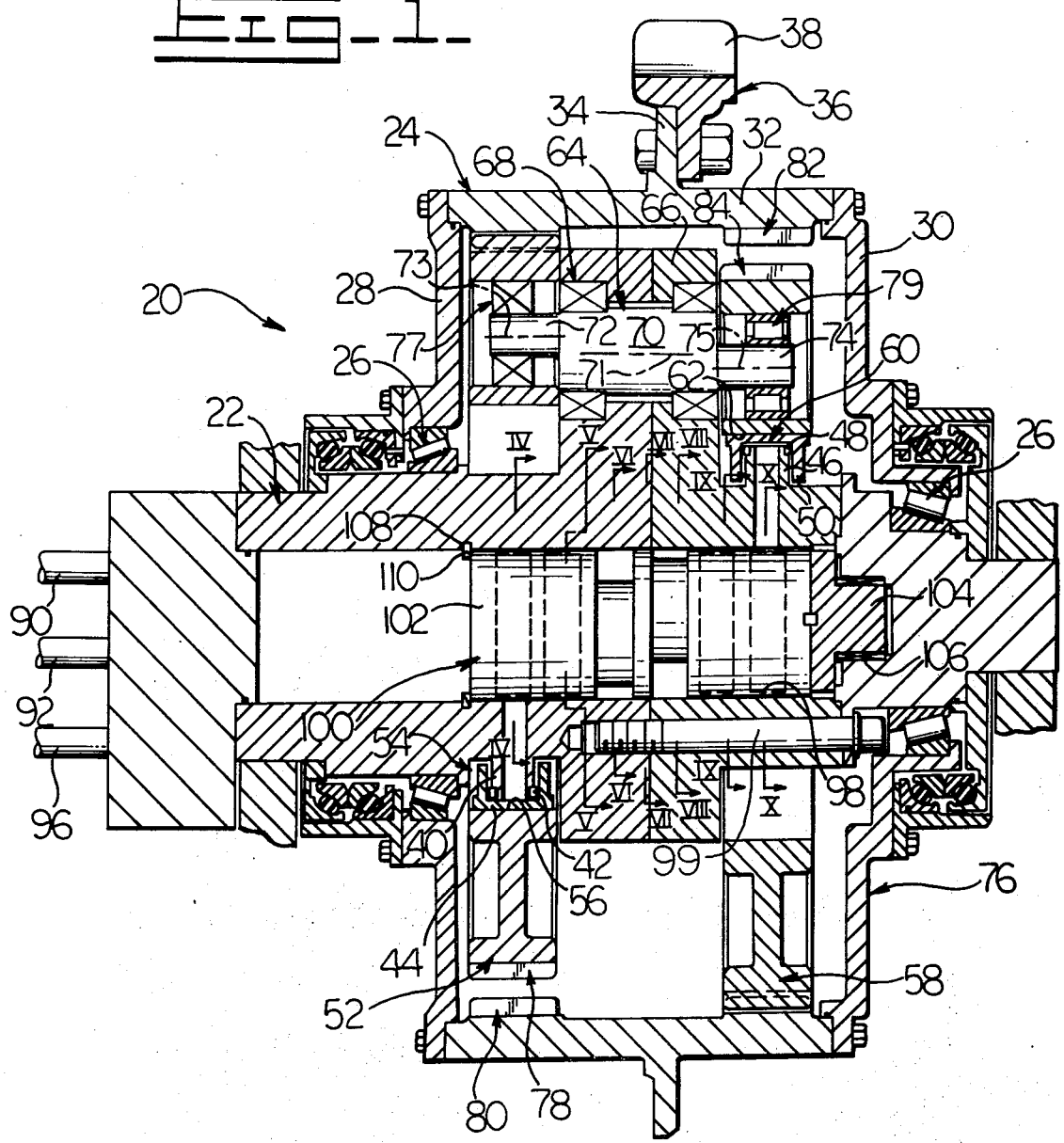
FIG. 1 is a side-sectional elevation of the apparatus incorporating the invention.

Shown generally in FIGS. 1 and 2 is a fluid-operated apparatus 20. The apparatus 20 includes centrally-positioned fixed body means 22, and rotary body means 24 are rotatably mounted on the fixed body means 22 by means of bearings 26. The rotary body means 24 are actually made up of side plates 28, 30 and an outer plate 32 having a projecting portion 34 to which is fixed a drive sprocket 36 having teeth 38. The fixed body means 22 define a first plurality of hollow, radial spokes 40 having pistons 42 fixed thereto. Reciprocably mounted on the spokes 40 are cylinders 44. The fixed body means 22 also define a second plurality of radially-disposed hollow spokes 46 having pistons 48 fixed thereto. Cylinders 50 are reciprocably mounted on the spokes 46.

A first orbiting member 52 is disposed about the fixed body means 22, actually being disposed about the piston and cylinder means 54 made up of pistons 42 and cylinders 44, whereby the piston and cylinder means 54 operatively interconnect the orbiting member 52 and the fixed body means 22, with the plurality of cylinders 44 in engagement with the inner periphery 56 defined by the orbiting member 52. A second orbiting member 58 is disposed about the fixed body means 22, being disposed about the piston and cylinder means 60 made up of pistons and cylinders 48,50. The orbiting member 58 defines an inner periphery 62, and the plurality of cylinders 50 is in engagement with such inner periphery 62 of the second orbiting member 58.

Means are included for movably mounting the orbiting members 52,58 relative to the fixed body means 22 for determining orbiting movement of the orbiting members 52,58 relative to the fixed body means 22. Such means comprise a plurality of crankshafts 64 rotatably mounted to an annularly-extending portion 66 of the fixed body means 22 by means of bearings 68. Each crankshaft 64 defines a main cylindrical body portion 70 mounted by the bearings 68, and first and second cylindrical portions 72,74 extending from the main body portion 70 on opposite sides thereof. It is to be noted that each crankshaft 64 is rotatable about the cylinder axis 71 of the main cylindrical body portion 70, with the cylinder axis 73 of the first extending cylindrical portion 72 being parallel to but spaced from the cylinder axis 71 of the main body portion 70, and the cylinder axis 75 of the second extending cylindrical portion 74 being parallel to but spaced from the cylinder axis 71 of the main cylindrical body portion 70 and the cylinder axis 73 of the first extending cylindrical portion 72.

The orbiting member 52 is rotatably mounted to the cylindrical portions 72 by means of bearings 77, and the orbiting member 58 is rotatably mounted to the extending portions 74 by means of bearings 79.

It is to be noted that the rotary body means 24 and fixed body means 22 together define a housing 76 for the first and second orbiting members 52,58 and the first and second piston and cylinder means 54,60.

The orbiting member 52 defines a plurality of outwardly-projecting teeth 78, and the outer plate 32 of the rotary body means 24 defines a plurality of inwardly-projecting teeth 80 of a number greater than the number of teeth defined by the orbiting member 52 (in this particular embodiment the orbiting member 52 defining 68 outwardly-projecting teeth, with the plurality of inwardly-projecting teeth 80 numbering 72). The teeth 78 of the orbiting member 52 are adaptable for engagement with the teeth 80 of the rotary body means 24. The rotary body means 24 also define a second plurality of inwardly-projecting teeth 82, and the orbiting member 58 defines a plurality of outwardly-projecting teeth 84 adaptable for engagement with the second plurality of teeth 82 of the rotary body means 24. The second plurality of inwardly-projecting teeth 82 are 72 in number, and the orbiting member 58 defines 68 outwardly-projecting teeth.

In reference to each crankshaft 64, the cylinder axis 71 of the main body portion 70 lies in the same plane as the cylinder axis 73 of the extended portion 72 and the cylinder axis 75 of the extended portion 74. Through such particular configuration of the crankshafts 64, the engagement of the plurality of teeth 82 and the teeth 84 of the orbiting member 58, and the engagement of the plurality of teeth 80 and the teeth 78 of the orbiting member 52 are on opposite sides of the fixed body means 22.

Means are included for conveying fluid to and from the piston and cylinder means 54,60 to provide orbiting movement of the first and second orbiting members 52,58 relative to the fixed body means 22. Such means include means for properly conveying fluid to and from the piston and cylinder means 54,60 at appropriate times and intervals for providing proper orbiting movement of the members 52,58.

As best shown in FIGS. 1 and 4-10, a plurality of passages 90, 92, 94, 96 are defined by the fixed body means 22, the passages 90, 92 communicating with a fluid pump (not shown) and the passages 94, 96 communicating with a fluid tank or reservoir (not shown). As shown, the fixed body means 22 may be made up of a number of sections secured together by bolts 99. The passages 90, 92, 94, 96 communicate with a bore 98 defined by the fixed body means 22 (FIGS. 6 and 8), and it will be seen that fluid may flow into bore 98 through the passages 90, 92, and from the bore 98 through the passages 96, 98. A rotatable valving element 100 is disposed within the bore 98, such rotatable valving element 100 being made up of a main portion 102 and an end portion 104 secured thereto, and rollingly supported relative to the fixed body means 22 by means of bearings 106. A snap ring 108 and a shoulder portion 110 within the bore 98 serve to locate the rotatable valving element 100 along the longitudinal axis of the bore 98. The valving element 100 defines first channel means 112 thereabout and communicating with the passages 90, 92 defined by the fixed body means 22 (see FIG. 6). Second channel means 114 (FIG. 4) are defined by the valving element 100, and disposed about a portion of the valving element 100, but not completely therearound. Such second channel means 114 communicate with some of the piston and cylinder means 54 of the plurality thereof, depending on the rotational position of the valving element 100 relative to the fixed body means 22. Internal passage means 116 defined by the valving element 100 communicate the first and second channel means 112, 114. As shown in FIG. 8, the valving element 100 defines third channel means 118 disposed completely thereabout and communicating with the passage means 94, 96 defined by the fixed body means 22. The valving element 100 also defines fourth channel means 120 disposed about a portion of the valving element 100 but not disposed completely therearound (see FIG. 4). The channel means 120 communicates with the other piston and cylinder means 54 not being communicated with by the second channel means 114, the second and fourth channel means 114, 120 being separated by portions 122, 124 extending on opposite sides therefrom (see FIG. 4). Internal passage means 126 defined by the valving element 100 communicate the third and fourth channel means 118, 120.

The valving element 100 also defines fifth channel means 128 (FIG. 10) disposed about a portion of the valving element 100 and not extending fully therearound, and communicating with some of the second plurality of piston and cylinder means 60, depending on the rotational position of the valving element 100 relative to the fixed body means 22. Internal passage means 130 defined by the valving element 100 communicate the first and fifth channel means 112, 128. The valving element 100 also defines sixth channel means 132 disposed about a portion of the valving element 100 and not continuous thereabout, and communicating with the other of the piston and cylinder means 60 of the second plurality thereof, which are not at that time being communicated-with the fifth channel means 128. Extended portions 134, 136 of the valving element 100 separate the fifth and sixth channel means 128, 132. Internal passage means 138 defined by the valving element 100 communicate the third and sixth channel means 118, 132.

It will be seen that the sixth and fourth channel means 132, 120 are disposed on generally opposite sides of the valving element 100, and fifth and second channel means 128, 114 are disposed on generally opposite sides of the valving element 100. The second and fourth channel means 114, 120 are in fact positioned laterally of each other on opposite sides of the valving element 100, and the fifth and sixth channel means 128, 132 are disposed laterally of each other on opposite sides of the valving element 100.

The valving element 100 also defines first additional channel means 140 (FIG. 5) disposed about a portion of the valving element 100 on a side thereof generally opposite the second channel means 114, and a passage 142 communicates fluid pressure to the first additional channel means 140 from the passage means 130.

Second additional channel means 144 (FIG. 5) are disposed about a portion of the valving element 100 on a side thereof generally opposite the fourth channel means 120, the second additional channel means 144 being communicated with the passage means 138. The valving element 100 further defines third additional channel means 146 (FIG. 9) disposed adjacent the sixth channel means 132 and on a side of the valving element 100 generally opposite the fifth channel means 128, such third additional channel means 146 communicating with fluid pressure in said passage means 116. The valving element 100 further defines fourth additional channel means 148 disposed about a portion of the valving element 100 adjacent the fifth channel means 128 on a side of the valving element 100 generally opposite the sixth channel means 132, the fourth additional channel means 148 communicating with the passage means 126.

The first and second additional channel means 140, 144 are disposed laterally of each other on opposite sides of the valving element 100, and the third and fourth additional channel means 146, 148 disposed laterally of each other on opposite sides of the valving element 100.

The additional channel means 140, 144 are separated by extending portions 152, 154 defined by the valving element 100. The additional channel means 146, 148 are separated by extending portions 156, 158 defined by the valving element 100.

The end member 104, making up a portion of the rotary valving element 100, is actually a gear element which is engaged with an idler gear 160 rotatably supported on a shaft 162 mounted to fixed body means 22, which is in turn in engagement with a gear 164 fixed to an end of one of the crankshafts 64 (see FIG. 3). The gear 164 is secured relative to the crankshaft 64 so as to be rotatable about the cylinder axis 71 of the main body portion 70 of that crankshaft 64. The gears 104, 160, 164 make up gear train means 166 interconnecting one of the crankshafts 64 and the valving element 100 for providing that upon rotation of that crankshaft 64 the valving element 100 is rotated through the gear train means 166.

In operation, fluid pressure is supplied to the second channel means 114 to some cylinders of the plurality 54 to provide a driving force to tend to provide orbiting movement of the member 52. Meanwhile, the fourth channel means 120 communicates with the reservoir, so that the opposite cylinders are relieved of fluid pressure. Such application and relief of fluid pressure provides orbiting movement of the orbiting member 52, the movement thereof being guided and determined by the crankshafts 64. Similarly, fluid pressure is applied to and released from appropriate cylinder means of the plurality of cylinder and piston means 60, but with the fluid pressure being applied in a manner 180° out of phase with the application of fluid pressure to the piston and cylinder means 54. The orbiting members 52,58 thereby orbit substantially 180° out of phase. Orbiting of the orbiting members 52,58 provides for rotation of the crankshafts 64 to in turn rotate the valving element 100 through the gear train means 166. As the valving element 100 is rotated relative to the fixed body means 22, communication is provided between each piston and cylinder means of the first plurality 54 thereof, and the first and second passage means 90,92 and 94,96 of the fixed body means 22 alternately, to alternately direct fluid to and allow flow of fluid from each piston and cylinder means of the first plurality 54 thereof. Similarly, as the valving element 100 is rotated relative to the fixed body means 22, communication is provided between each piston and cylinder means of the second plurality 60 thereof, and the first and second passage means 90,92 and 94,96 of the fixed body means 22 alternately, to alternately direct fluid to and allow flow of fluid from each piston and cylinder means of the second plurality 60 thereof.

Referring to FIGS. 4 and 5, it will be seen that the pressure applied to the first additional channel means 140 tends to balance the pressure applied to the valve element 100 through the second channel means 114. Furthermore, the second additional channel means 144 and fourth channel means 120 both communicate with the reservoir so that, it will be seen, that portion of the valving element 100 is generally balanced in regard to lateral forces applied thereto. Similarly, referring to FIGS. 9 and 10, the lateral force applied to the valving element 100 through the fifth channel means 128 is generally balanced by the lateral force applied to the valving element 100 through the third additional channel means 146, with the sixth channel means 132 and fourth additional channel means 148 communicating with the reservoir. It will, therefore, be seen that the valving element 100 is properly balanced to allow smooth and relatively free rotation thereof.

In the operation of the apparatus, fluid pressure is conveyed to and from the piston and cylinder means 54,60 through the valving element 100 described above, and such application and release of fluid drives the orbiting members 52,58, the orbiting movement thereof being determined by the crankshafts 64. Since each of the orbiting members 52,58 defines 68 teeth, and each of the plurality of teeth defined by the rotary body means 24 includes 72 teeth, a single orbit of both the orbiting members 52,58 forces the rotary body means 24 to advance four teeth. Such rotary body means 24, as set forth above, drives the output sprocket of a vehicle.

It should be understood that if fluid flow is reversed, i.e., supplied through passages 94,96, and exiting through passages 90,92, the operation of the overall apparatus will be reversed.

Figure 11:
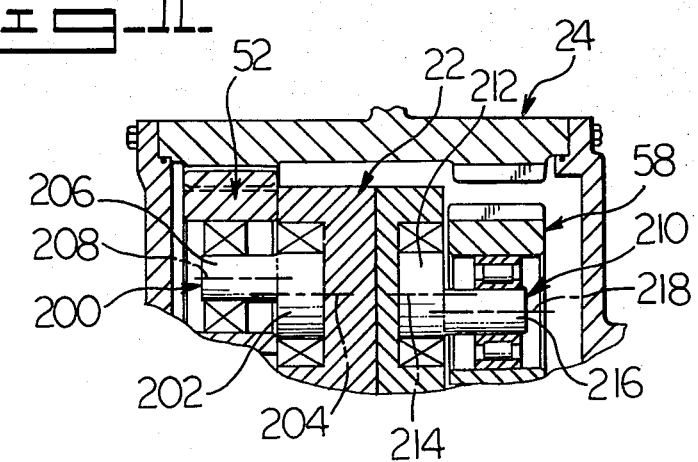
FIG. 11 is a view similar to a portion shown in FIG. 1, but of another embodiment of that portion of the invention.

Shown in FIG. 11 is a variation of the crankshaft system of the apparatus. The crankshaft system of FIG. 11 includes a first plurality of crankshafts 200, each made up of a main cylindrical body portion 202 defining a cylinder axis 204 about which the crankshaft 200 is rotatable relative to the fixed body means 22, and an extending body portion 206 defining an extending cylindrical portion, the cylinder axis 208 of which is parallel to but spaced from the cylinder axis 204 of the main cylindrical body portion 202. Each extending cylindrical portion 206 is rotatably mounted to the orbiting member 52.

A second plurality of crankshafts 210 is included, each crankshaft 210 of the second plurality thereof including a main cylindrical body portion 212 defining a cylinder axis 214 about which the crankshaft 210 is rotatable relative to the fixed body means 22, and an extending body portion 216 defining an extending cylindrical portion, the cylinder axis 218 of which is parallel to but spaced from the cylinder axis 214 of the main cylindrical body portion 212. Each extending cylindrical portion 216 is rotatably mounted to the orbiting member 58. Each crankshaft 200 of the first plurality thereof is paired with a crankshaft 210 of the second plurality thereof, with the main cylindrical body portions 202,212 thereof adjacent, and with the cylindrical axes 204,214 of the adjacent main cylindrical portions 202,212 being coincident.

It will be seen that operation of the system shown in FIG. 11 is generally the same as that shown in the apparatus previously described.

It is to be noted that the apparatus disclosed in either embodiment can be used as a pump rather than a motor, as described, by applying rotative force to the member 24, which would in turn drive the orbiting members 52,58 to in turn provide proper reciprocation of the piston and cylinder means to determine a pumping action in passage means 90,92,94,96 defined by the fixed body means 22.

What is claimed is:

1. A fluid pressure apparatus comprising:
   fixed body means;
   a first orbiting member disposed about said fixed body means, defining a plurality of outwardly-projecting teeth;
   a second orbiting member disposed about said fixed body means, defining a plurality of outwardly-projecting teeth equal in number to the teeth defined by the first member;
   means movably mounting the first and second orbiting members relative to the fixed body means for determining orbiting movement of the first and second orbiting members relative to the fixed body means;
   a first plurality of piston and cylinder means operatively interconnecting the fixed body means and first orbiting member;
   a second plurality of piston and cylinder means operatively interconnecting the fixed body means and second orbiting member;
   rotary body means defining a first plurality of inwardly-projecting teeth of a number greater than the number of teeth defined by the first orbiting member, the teeth of the orbiting member being adaptable for engagement with the first plurality of teeth of the rotary body means, and defining a second plurality of inwardly-projecting teeth of a number equal to the number of the first plurality of inwardly-projecting teeth defined by the rotary body means, the teeth of the second orbiting member being adaptable for engagement with the second plurality of teeth of the rotary body means, and
   wherein the means movably mounting the first and second orbiting members relative to the fixed body means comprise a plurality of crankshafts, each defining a main body portion rotatably mounted to the fixed body means, a first extending portion spaced from the axis of rotation of the main body portion and to which the first orbiting member is rotatably mounted, and a second extending portion spaced from the axis of rotation of the main body portion and to which the second orbiting member is rotatably mounted.

2. The apparatus of claim 1 wherein the engagement of the first plurality of teeth of the rotary body means and the teeth of the first orbiting member and the engagement of the second plurality of teeth of the rotary body means and the teeth of the second orbiting member are on opposite sides of the fixed body means.

3. The apparatus of claim 1 wherein the main body portion of each crankshaft comprises a main cylindrical body portion defining a cylinder axis about which the crankshaft is rotatable relative to the fixed body means, the first extending portion defining a first extending cylindrical portion, the cylinder axis of which is parallel to but spaced from the cylinder axis of the main cylindrical body portion, tthe second extending portion defining a second extending cylindrical portion, the cylinder axis of which is parallel to but spaced from the cylinder axis of the main cylindrical body portion and the cylinder axis of the first extending cylindrical portion.

4. A fluid pressure apparatus comprising:
   fixed body means;
   a first orbiting member disposed about said fixed body means, defining a plurality of outwardly-projecting teeth;
   a second orbiting member disposed about said fixed body means, defining a plurality of outwardly-projecting teeth equal in number to the teeth defined by the first member;
   means movably mounting the first and second orbiting members relative to the fixed body means for determining orbiting movement of the first and second orbiting members relative to the fixed body means;
   a first plurality of piston and cylinder means operatively interconnecting the fixed body means and first orbiting member;
   a second plurality of piston and cylinder means operatively interconnecting the fixed body means and second orbiting member;
   rotary body means defining a first plurality of inwardly-projecting teeth of a number greater than the number of teeth defined by the first orbiting member, the teeth of the orbiting member being adaptable for engagement with the first plurality of teeth of the rotary body means, and defining a second plurality of inwardly-projecting teeth of a number equal to the number of the first plurality of inwardly-projecting teeth defined by the rotary body means, the teeth of the second orbiting member being adaptable for engagement with the second plurality of teeth of the rotary body means, wherein the means movably mounting the first and second orbiting members relative to the fixed body means comprise a first plurality of crankshafts, each defining a main body portion rotatably mounted to the fixed body means, and an extending portion spaced from the axis of rotation of the main body portion, and to which the first orbiting member is rotatably mounted, and a second plurality of crankshafts, each defining a main body portion rotatably mounted to the fixed body means, and an extending portion spaced from the axis of rotation of the main body portion and to which the second orbiting member is rotatably mounted.

5. The apparatus of claim 4 wherein the main body portion of each crankshaft comprises a main cylindrical body portion defining a cylinder axis about which the crankshaft is rotatable relative to the fixed body means, the extending body portion of each crankshaft defining an extending cylindrical portion, the cylinder axis of which is parallel to but spaced from the cylinder axis of the main cylindrical body portion.

6. The apparatus of claim 5 wherein each crankshaft of the first plurality thereof is paired with a crankshaft of the second plurality thereof, with the main cylindrical body portions thereof adjacent and with the cylindrical axes of said adjacent main cylindrical body portions being coincident.

7. Apparatus for rotating an output drive member of a vehicle comprising:
   fixed body means mounted relative to the vehicle;
   a first orbiting member defining a plurality of teeth;
   a second orbiting member defining a plurality of teeth equal in number to the teeth defined by the first orbiting member;
   means movably mounting the first and second orbiting members relative to the fixed body means for determining orbiting movement of the first and second orbiting members relative to the fixed body means;

means for providing orbiting movement of the first and second orbiting members relative to the fixed body means; and rotary body means defining a first plurality of projecting teeth of a number different from the number of teeth defined by the first orbiting member, the teeth of the first orbiting member being adaptable for engagement with the first plurality of teeth of the rotary body means, the rotary body means defining a second plurality of projecting teeth of a number equal to the number of teeth of the first plurality of projecting teeth defined by the rotary body means, the teeth of the second orbiting member being adaptable for engagement with the second plurality of teeth of the rotary body means, the rotary body means being secured relative to the output drive member, wherein the means movably mounting the first and second orbiting members relative to the fixed body means comprise a plurality of crankshafts, each defining a main body portion rotatably mounted to the fixed body means, a first extending portion spaced from the axis of rotation of the main body portion, and to which the first orbiting member is rotatably mounted, and a second extending portion spaced from the axis of rotation of the main body portion, and to which the second orbiting member is rotatably mounted.

8. The apparatus of claim 1 wherein the main body portion of each crankshaft comprises a main cylindrical body portion defining a cylinder axis about which the crankshaft is rotatably relative to the fixed body means, the first extending portion defining a first extending cylindrical portion, the cylinder axis of which is parallel to but spaced from the cylinder axis of the main cylindrical body portion, the second extending portion defining a second extending cylindrical portion, the cylinder axis of which is parallel to but spaced from the cylinder axis of the main cylindrical body portion and the cylinder axis of the first extending cylindrical portion.

9. The apparatus of claim 7 wherein the engagement of the first plurality of teeth of the rotary body means and the teeth of the first orbiting member, and the engagement of the second plurality of teeth of the rotary body means and the teeth of the second orbiting member are on opposite sides of the fixed body means.

10. The apparatus of claim 9 wherein the rotary body means and fixed body means together define a housing for the first and second orbiting members.

11. The apparatus of claim 10 wherein the first and second orbiting members are disposed about the fixed body means, and define outwardly-projecting teeth, the rotary body means defining first and second pluralities of inwardly-projecting teeth.

12. Apparatus for rotating an output drive member of a vehicle comprising:

fixed body means mounted relative to the vehicle;

a first orbiting member defining a plurality of teeth;

a second orbiting member defining a plurality of teeth equal in number to the teeth defined by the first orbiting member;

means movably mounting the first and second orbiting members relative to the fixed body means for determining orbiting movement of the first and second orbiting members relative to the fixed body means;

means for providing orbiting movement of the first and second orbiting members relative to the fixed body means; and rotary body means defining a first plurality of projecting teeth of a number different from the number of teeth defined by the first orbiting member, the teeth of the first orbiting member being adaptable for engagement with the first plurality of teeth of the rotary body means, the rotary body means defining a second plurality of projecting teeth of a number equal to the number of teeth of the first plurality of projecting teeth defined by the rotary body means, the teeth of the second orbiting member being adaptable for engagement with the second plurality of teeth of the rotary body means, the rotary body means being secured relative to the output drive member, wherein the first and second orbiting members are disposed about the fixed body means, and define outwardly-projecting teeth, the rotary body means defining first and second pluralities of inwardly-projecting teeth, and wherein the means movably mounting the first and second orbiting members relative to the fixed body means comprise a first plurality of crankshafts, each defining a main body portion rotatably mounted to the fixed body means, and an extending portion spaced from the axis of rotation of the main body portion, and to which the first orbiting member is rotatably mounted, and a second plurality of crankshafts each defining a main body portion rotatably mounted to the fixed body means, and an extending portion spaced from the axis of rotation of the main body portion and to which the second orbiting member is rotatably mounted.

13. The apparatus of claim 12 wherein the main body portion of each crankshaft comprises a main cylindrical body portion defining a cylinder axis about which the crankshaft is rotatable relative to the fixed body means, the extending body portion of each crankshaft defining an extending cylindrical portion, the cylinder axis of which is parallel to but spaced from the cylinder axis of the main cylindrical body portion.

14. The apparatus of claim 13 wherein each crankshaft of the first plurality thereof is paired with a crankshaft of the second plurality thereof, with the main cylindrical body portions thereof adjacent and with the cylindrical axes of said adjacent main cylindrical body portions being coincident.

* * * * *